US012441946B2

(12) United States Patent
Zhou et al.

(10) Patent No.: US 12,441,946 B2
(45) Date of Patent: Oct. 14, 2025

(54) PROCESS FOR INCREASING LIQUID FUEL YIELD FROM CARBON OXIDES

(71) Applicant: UOP LLC, Des Plaines, IL (US)

(72) Inventors: Ling Zhou, Palatine, IL (US); Jan de Ren, Arlington Heights, IL (US); Sakthivelan Maadasamy Durai, Gurugram (IN)

(73) Assignee: UOP LLC, Rosemont, IL (US)

( * ) Notice: Subject to any disclaimer, the term of this patent is extended or adjusted under 35 U.S.C. 154(b) by 0 days.

(21) Appl. No.: 18/978,690

(22) Filed: Dec. 12, 2024

(65) Prior Publication Data
US 2025/0215337 A1 Jul. 3, 2025

Related U.S. Application Data

(60) Provisional application No. 63/616,395, filed on Dec. 29, 2023.

(51) Int. Cl.
*C10G 69/12* (2006.01)
(52) U.S. Cl.
CPC ... *C10G 69/126* (2013.01); *C10G 2300/1022* (2013.01); *C10G 2300/706* (2013.01); *C10G 2400/08* (2013.01)

(58) Field of Classification Search
CPC .......... C10G 69/126; C10G 2300/1022; C10G 2300/706; C10G 2400/08
See application file for complete search history.

(56) References Cited

U.S. PATENT DOCUMENTS

2019/0119182 A1* 4/2019 McCormick ........... C10G 11/05

* cited by examiner

*Primary Examiner* — Brian A McCaig
(74) *Attorney, Agent, or Firm* — Paschall & Associates, LLC; James C. Paschall

(57) ABSTRACT

A process for supplementing production of liquid fuel from carbon oxides is disclosed. The process comprises contacting a hydrocarbon feed stream with a catalyst in a reactor to produce a reactor effluent stream. The reactor effluent stream is separated to provide a dry gas stream. The dry gas further separated into a CO2 rich stream and a CO2 lean stream. The CO2 lean stream is used to produce methanol. The methanol is contacted with an MTO catalyst to produce an olefin stream. The olefin stream is oligomerized by contacting it with an oligomerization catalyst in an oligomerization reactor to produce an oligomerized olefin stream which is further hydrogenated. A sustainable aviation fuel is taken from the hydrogenated oligomerized stream.

20 Claims, 3 Drawing Sheets

PROCESS FOR INCREASING LIQUID FUEL YIELD FROM CARBON OXIDES

FIELD

The field relates to production of fuel from biorenewable feedstock. The field may particularly relate to production of liquid fuel from carbon oxides.

BACKGROUND

As the demand for fuel increases worldwide, there is increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to deoxygenate, including decarboxylate and decarbonylate, the oxygenated hydrocarbons. Hydrotreating may be followed by hydroisomerization to improve cold flow properties of product diesel and jet fuel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

In a bio-refinery, a large amount of renewable-based carbon monoxide (CO) and carbon dioxide ($CO_2$) are produced in the cracking and hydroprocessing reactors from thermal or catalytic deoxygenation of biomass to produce oxygen-free biofuels, including sustainable aviation fuel, bio-gasoline, bio-diesel and bio-marine fuel. In addition, renewable-based CO and $CO_2$ are also produced in the regenerator from the burning of coke on spent catalysts and char produced in the reactor due to limited mass and heat transfer, while the energy generated supplies the heat balance in the process. The total amount of carbon in the biogenic CO and $CO_2$ generated in the process could account for up to 50% of the carbon from renewable biomass feed. It remains a challenge to cost-effectively capture the renewable-based CO and $CO_2$ and convert them to more valuable products.

As refiners seek to add capability for processing biorenewable feedstocks, processes are sought to produce greater volumes of jet fuel due to its high value and demand. Processes for producing diesel and increased yield of jet fuel from biorenewable feedstocks are desired. Also, process to capture and utilize biogenic CO and $CO_2$ to produce biofuels is also sought.

SUMMARY

The present disclosure provides a process for production of a liquid fuel from carbon oxides. The disclosed process maximizes fuel production from renewable feeds. In the process, a hydrocarbon feed stream is cracked to produce a reactor effluent stream. The reactor effluent stream is separated to provide a dry gas stream which is further separated into a $CO_2$ rich stream and a $CO_2$ lean stream. One or both of the $CO_2$ rich stream and the $CO_2$ lean stream may be used to produce methanol. The methanol is contacted with an MTO catalyst to produce an olefin stream which is oligomerized to produce an oligomerized olefin stream. The oligomerized olefin stream is further hydrogenated. A liquid fuel is separated or taken from the hydrogenated oligomerized stream.

The disclosed process is an integrated process to capture and utilize biogenic CO and $CO_2$ to produce biofuels in a cost-effective way.

DEFINITIONS

Figure 1:
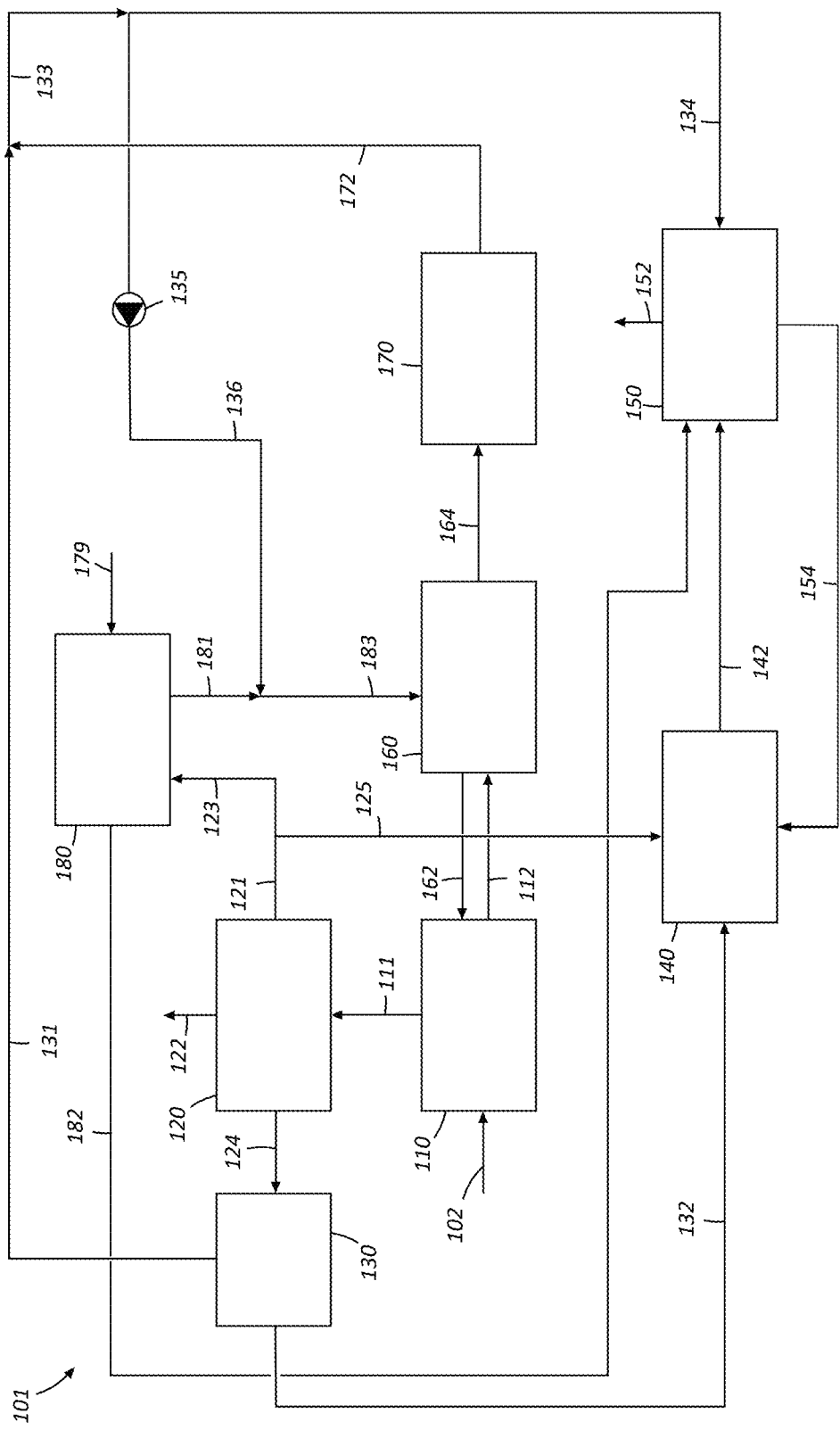
FIG. 1 is a simplified process flow diagram of the present disclosure.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take a main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "end point" (EP) means the temperature at which the sample has all boiled off using ASTM D2887, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" is to be understood to refer to molecules having the number of carbon atoms represented by the subscript "x". Similarly, the term "$C_{x-}$" refers to molecules that contain less than or equal to x and preferably x and less carbon atoms. The term "$C_{x+}$" refers to molecules with more than or equal to x and preferably x and more carbon atoms.

As used herein, the term "carbon number" refers to the number of carbon atoms per hydrocarbon molecule and typically a paraffin molecule.

As used herein, the term "passing" includes "feeding" and means that the material passes from a conduit or vessel to an object.

As used herein, the term "a component rich stream" means that the rich stream coming out of a vessel has a greater concentration of the component than the feed to the vessel.

As used herein, the term "a component lean stream" means that the lean stream coming out of a vessel has a smaller concentration of the component than the feed to the vessel.

As used herein, the prefix "bio" as used herein, refers to an association with a renewable resource of biological origin, such resources generally being exclusive of fossil fuels.

As used herein, the term "biofuel," as defined herein, is a fuel product at least partly derived from "biomass," the latter being a renewable resource of biological origin.

DETAILED DESCRIPTION

Renewable feedstocks have become increasingly important as key enabler for emission reduction of fossil fuel-based conventional refinery. Stakeholders are interested in new technologies for processing blended renewable feedstocks or even 100% renewable feedstocks in fluid catalytic cracking or hydroprocessing units. The chemical nature of converting biomass to drop-in fuels is through thermal or catalytic deoxygenation, which CO, CO2 and H2O are largely produced as yield loss. A process for maximizing fuel production from renewable feeds is disclosed. The present disclosure integrates a biomass conversion process with an oxi-combustion, methanol synthesis, and methanol-to-biofuel processes, in order to maximize the utilization of the biogenic carbon and the biofuel yield. The present disclosure enables refiners to maximize jet fuel (SAF) yield produced from biorenewable sources.

In FIG. 1, in accordance with an exemplary embodiment, a process 101 is shown for production of a liquid fuel. The process 101 comprises a cracking unit 110, a separation unit 120, a regenerator 160, a contaminant removal section 170, a gas processing unit 140, and a fuel production unit 150. A hydrocarbon feed stream in line 102 is passed to the cracking unit 110. In an embodiment, the hydrocarbon feed stream in line 102 may be a renewable feed stream. The renewable feed stream may comprise a feedstock of bio-origin. In an exemplary embodiment, the renewable feed stream in line 102 may comprise biorenewable feedstocks. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may source phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising *Jatropha curcas* (Ratanjot, Wild Castor, Jangli Erandi), *Madhuca indica* (Mohuwa), *Pongamia pinnata* (Karanji, Honge), *Calophyllum inophyllum, Moringa oleifera* and *Azadirachta indica* (Neem). The triglycerides and FFAs of the typical vegetable or animal fat contain aliphatic hydrocarbon chains in their structure which have about 8 to about 30 carbon atoms. The advanced bio-refinery feed may include lignocellulosic feedstocks (LCF) which include wood, straw, grasses, etc. and LCFs are composed of 40-50% cellulose, 25-30% hemicellulose and 15-20% lignin. The chemical composition of LCFs also varies considerably, depending on its source. Cellulose is a high molecular weight linear polymer composed of β-glucose (5000-10000 units) and linked by β-1,4-glycosidic bonds. It is a highly crystalline material, and because of this crystallinity, cellulose is not soluble in water. This attribute makes it challenging to convert into monomer sugars through hydrolysis. Hemicellulose is an amorphous branched polymer and contains both C5 (xylose, arabinose, and rhamnose) and C6 sugars (glucose, mannose, and galactose), as well as uronic acids components. Hemicellulose contains approximately 150 repeating monosaccharide units, and the type of monomer sugars present varies depending on the type of material. For example, in hardwood and agricultural plants, hemicellulose contains mainly xylan, a polymer of xylose, whereas in softwood hemicellulose its main building block is glucomannan, a polymer of D-mannose and D-glucose linked by β-1,4-glycosidic bonds. Hemicellulose is amorphous in nature, highly soluble in water, and thus readily hydrolyzes to the corresponding monomer sugars as opposed to cellulose. As will be appreciated, the biorenewable feedstock may comprise a mixture of one or more of the foregoing examples. The biorenewable feedstock may be pretreated to remove contaminants and filtered to remove solids. The biorenewable feedstock may comprise a nitrogen concentration of about 50 wppm to about 800 wppm. The biorenewable feedstock may comprise high oxygen content which can be up to 10 wt % or higher. The biorenewable feedstock may also comprise about 1 to about 500 wppm sulfur, typically no more than about 200 wppm sulfur.

The renewable feed stream in line 102 is passed to a reactor in the cracking unit 110. In accordance with an embodiment of the present disclosure, the cracking unit 110 may be a thermal cracking unit or a catalytic cracking unit. The thermal cracking unit 110 comprises a thermal cracker, wherein the renewable feed stream is subjected to thermal cracking to produce a cracked stream. Thermal cracking is preferably carried out without catalyst. The thermal cracking unit may be operated at a temperature from about 700 to about 900° C. In an aspect, the thermal cracking unit 110 may be a steam cracking unit.

In accordance with another embodiment of the present disclosure, the cracking unit 110 may be a catalytic cracking unit. The cracking unit 110 comprises a reactor wherein the renewable feed stream is contacted with a cracking catalyst. In an aspect, the cracking unit 110 comprises a fluidized reactor. In an embodiment, the cracking unit 110 is fluid catalytic cracking (FCC) unit.

The cracking catalyst may comprise any of the well-known catalysts that are used in the art of FCC, such as an active amorphous clay-type catalyst and/or a high activity, crystalline molecular sieve. Zeolites may be used as molecular sieves in FCC processes. Preferably, the catalyst comprises a zeolite, an active alumina material, a binder material, and an inert filler such as kaolin. Collectively, the active alumina, binder material and inert filler may be known as matrix material.

The zeolite component may include a medium or smaller pore zeolite catalyst, such as a MFI zeolite, as exemplified by at least one of ZSM-5, ZSM-11, ZSM-12, ZSM-23, ZSM-35, ZSM-38, ZSM-48, and other similar materials. Other suitable medium or smaller pore zeolites include ferrierite, and erionite. These catalyst compositions may have a crystalline zeolite content of 10 to 50 wt-% or more, and a matrix material content of 50 to 90 wt-%. Components containing 40 wt-% crystalline zeolite material are preferred, and those with greater crystalline zeolite content may be used. Generally, medium and smaller pore zeolites are characterized by having an effective pore opening diameter of less than or equal to 0.7 nm and rings of 10 or fewer members. Preferably, the zeolite component is an MFI zeolite having high silica to alumina ratios. Preferred silica to alumina ratios are greater than 300, with a more preferred ratio greater than 400, and a most preferred ratio greater than 1000. The catalyst crystals of the present invention may have the external surface acid site neutralized, thereby limiting the amount of activity on the external surface of the catalyst.

A cracking effluent stream is taken in line 111 and passed to the separation unit 120. The separation unit 120 may be a fractionation column such as a main column and/or a series of fractionation columns and other separation units that may separate the cracking effluent stream into a vapor stream and one or more liquid streams. The liquid streams can be further processed, separated or taken to provide one or more product streams including bio-propylene, bio-butylene, bio-gasoline, bio-marine fuel in one or more product lines 122 from the separation unit 120. A water stream is also separated from the separation unit 120 in line 121.

The vapor stream separated from the separation unit 120 in line 124 may comprise light gases, carbon oxides, hydrogen, and light hydrocarbons. The vapor stream with its components may be collectively called a dry gas stream. The dry gas stream may be taken from a gas concentration unit of the separation unit 120. The dry gas stream in line 124 may be passed to an absorption unit 130 to separate a first $CO_2$ rich stream from a $CO_2$ lean dry gas stream. In an exemplary embodiment, the absorption unit 130 comprises a sponge absorber column. The $CO_2$ rich stream is taken in line 131 and the $CO_2$ lean dry gas stream is taken in line 132 from the absorption unit 130. In accordance with the present disclosure, the $CO_2$ rich stream in line 131 may comprise from about 50 wt % to about 100 wt % $CO_2$, and the $CO_2$ lean stream in line 132 may comprise from about 0 wt % to about 50 wt % $CO_2$. The $CO_2$ lean stream may also include light hydrocarbons and other gases. In an aspect, the separation unit 120 comprises the absorption unit 130 and the $CO_2$ rich stream in line 131 and the $CO_2$ lean stream in line 132 may be separated in the separation unit 120.

The separated $CO_2$ rich stream in line 131 and the $CO_2$ lean stream in line 132 are integrated in the process 101 thereby capturing and utilizing the biogenic CO and $CO_2$ to produce one or more biofuels in a cost-effective way. In accordance with an aspect of the present disclosure, the $CO_2$ lean stream in line 132 may be processed to provide a synthesis gas (syngas) stream.

The CO2 lean stream in line 132 is passed to the gas processing unit 140. A water stream or steam in line 125 may also be passed to the gas processing unit 140. The gas processing unit 140 may convert the CO2 lean stream in line 132 into syngas stream comprising carbon oxides and hydrogen by reforming with steam in a steam reforming reactor, an autothermal reforming reactor, or a dry reforming reactor.

Steam Reforming

In steam reforming, the lean CO2 stream comprising CO2 and light hydrocarbons is steam reformed at high temperatures with CO2 and steam to create a syngas mixture that can be used directly as a feed for methanol synthesis. Methanol synthesis is an endothermic process which requires a substantial amount of external heat.

The lean CO2 stream must comprise one to two carbon equivalents of carbon dioxide relative to the hydrocarbons to prevent elemental carbon production. The lean CO2 stream is mixed with steam to produce a mixture containing about 1 mol carbon from hydrocarbons to 1 to 2 moles water. The steam mixture with the lean CO2 enters a steam reforming process unit charged with commercially available nickel catalyst. The conversion of the hydrocarbons to carbon monoxide and hydrogen takes place at about 700° C. to about 900° C. at a system pressure that may be between 12 and 500 psia. A typical flow rate for the steam reforming reactor would be about 300 lbs/hr/cubic feet of catalyst. After condensation of the water, the product gas from steam reforming may be fed in line 142 to the fuel production unit 150.

Autothermal Reforming

Autothermal reforming combines both partial oxidation and steam reforming. Oxygen from the electrolyzer unit 180 in line 125, steam, and the lean CO2 stream in line 132 are reacted over a catalyst to produce an appropriate syngas mixture for conversion to methanol.

The gaseous stream is reacted in an autothermal reactor to produce a syngas stream comprising largely CO and hydrogen. Combustion heat from the exothermic partial oxidation of hydrocarbons helps drive the endothermic steam reforming process. The resultant syngas can be fed in line 142 to the fuel production unit 150.

Dry Reforming

Dry reforming is an endothermic reaction between methane and carbon dioxide to produce carbon monoxide and hydrogen. The gaseous stream is reacted in a dry reformer to produce syngas. The resultant syngas can be fed in line 142 to the fuel production unit 150.

Partial Oxidation

Alternatively, a syngas stream comprising carbon oxides and hydrogen may be produced by partially oxidizing the lean carbon dioxide stream in a partial oxidation reactor with oxygen.

The syngas is removed in line 142 from the gas processing unit 140. The syngas stream in line 142 is passed to the fuel production unit 150 to produce the jet fuel. In accordance with the present disclosure, the syngas in line 142 is a green syngas.

Referring back to the cracking unit 110, the cracking reaction also generates coke which is deposited on the catalyst. A spent catalyst stream is taken in line 112 from the cracking unit 110 and passed to the regenerator 160. During regeneration, coke deposited on the catalyst particles from reactions in the reaction zone is removed at elevated temperatures by oxidation in the regenerator 160. The removal of coke deposits restores the activity of the catalyst particles to the point where they can be reused in the reaction zone. A regenerated catalyst stream is taken in line 162 from the regenerator 160. The regenerated catalyst stream in line 162 is passed back to the cracking unit 110. Burning coke in the regenerator 160 produces a flue gas comprising carbon oxides, sulfur oxides, nitrogen oxide, water, and particulate matter (PM). The flue gas stream is taken in line 164 from the regenerator 160. The current integrated process comprises separating carbon oxides from the regenerator flue gas stream and converting or processing the separated carbon oxides to produce one or more biofuels.

The flue gas stream in line 164 is passed to the contaminant removal section 170 to remove the contaminants from the flue gas. In an aspect, the flue gas stream in line 164 may be contacted with a reactant stream to separate the contaminants from the flue gas stream. In another aspect, the flue gas stream in line 164 may be passed to a filter in the contaminant removal section 170 to remove the particulate and fines from the flue gas. A contaminant depleted flue gas stream may be further cooled and compressed in the contaminant removal section 170 to provide a regenerator CO2 stream. The regenerator CO2 stream is a CO2 rich stream. A regenerator CO2 stream is taken in line 172 from the contaminant removal section 170. In accordance with the present disclosure, the regenerator CO2 stream in line 172 may be combined with the CO2 rich stream in line 131 to provide a combined CO2 rich stream in line 133. In an aspect, the regenerator CO2 stream in line 172 may be split into a first CO2 rich stream and a second CO2 rich stream. The first CO2 rich stream may be recycled to the regenerator 160 and the second CO2 rich stream may be combined with the CO2 rich stream in line 131 to provide the combined CO2 rich stream in line 133.

In an embodiment, heat can be recovered from the regenerator flue gas stream in line 164 by preheating a boiler feed water used in a CO combustor. In an exemplary embodiment, the regenerator flue gas stream in line 164 may be passed to a CO boiler to convert CO in the flue gas to CO2 while producing heat that is recovered by production of steam. A converted flue gas stream is then sent for contaminant removal.

Turning back to the regenerator 160, a synthesized air stream in line 183 is passed to the regenerator to burn the coke from the catalyst. In an aspect of the present disclosure, the synthesized air stream in line 183 may comprise one or more separated carbon dioxide streams of the process 101. In an embodiment, a water stream in line 179 is passed to an electrolyzer 180 to produce hydrogen and oxygen which is used to provide the synthesized air stream in line 183. Various types of electrolyzers may be used as the electrolyzer 180 including but not limited to a polymer electrolyte membrane/proton exchange membrane (PEM/PEMEC), an alkaline electrolysis cell (AEC), an anion exchange membrane (AEM), and a solid oxide electrolysis cell (SOE/SOEC). Another water stream in line 123 may also be passed to the electrolyzer 180. Heat is also provided to the electrolyzer 180 from any suitable heat source. In an aspect, the electrolyzer 180 is powered by green energy. In accordance with the present disclosure, the water stream in line 123 is taken from the separation unit 120. The water stream from the separation unit 120 in line 121 is separated to provide a first water stream in line 123 and a second water stream in line 125. The first water stream in line 123 is passed to the electrolyzer 180 and the second water stream is passed to the gas processing unit 140 to be employed in the production of syngas. An oxygen stream is withdrawn in line 181 from the electrolyzer 180. Hydrogen produced in the electrolyzer 180 can be withdrawn in line 182 and passed to the fuel production unit 150. The oxygen stream in line 181 is passed to the regenerator 160 through line 183.

In accordance with the present disclosure, the combined CO2 rich stream in line 133 may be separated to provide a CO2 recycle stream in line 136 and a CO2 feed stream in line 134. The CO2 recycle stream in line 136 may be passed through a recycle blower 135 and combined with the oxygen stream in line 181 to provide the synthesized air stream in line 183. The synthesized air stream in line 183 is passed to the regenerator 160 to burn the coke from the catalyst.

The present disclosure provides for converting the syngas stream in line 142 into a sustainable fuel in the fuel production unit 150. The process comprises reacting a mixture of carbon dioxide and hydrogen in the fuel production unit 150 to produce methanol, carbon monoxide, and water. The methanol is contacted with a methanol to olefins (MTO) catalyst in an MTO reactor of the fuel production unit 150 to produce an olefin stream. The olefin stream is oligomerized with an oligomerization catalyst in an oligomerization reactor of the fuel production unit 150 to produce an oligomerized olefin stream. The oligomerized olefin stream is hydrogenated to produce fuel comprising jet fuel, diesel fuel, and other fuels. The means and method steps of producing the sustainable fuels from the syngas stream 142 are described below to accomplish the aforesaid.

In an aspect, the fuel production unit 150 may comprise a methanol synthesis section and a methanol purification section. The syngas stream in line 142 and the hydrogen gas stream in line 182 are passed to the methanol synthesis section. Syngas is defined as a gas comprising primarily carbon monoxide, carbon dioxide and hydrogen. Optionally, syngas may also include methane, and small amounts of ethane and propane. In an exemplary embodiment, hydrogen may be separated from the dry gas stream in line 124 by means of a pressure swing adsorption (PSA) unit from which hydrogen is fed to the fuel production unit 150 to supplement the hydrogen gas stream in line 182 while the hydrogen depleted dry gas stream is transported to the absorption unit 130 for carbon dioxide purification.

The methanol synthesis section may comprise a first methanol converter and a second methanol converter. The syngas stream in line 142 and the hydrogen gas stream in line 182 are passed to the first methanol converter of the methanol synthesis section. In an embodiment, the syngas stream in line 142 and the hydrogen gas stream in line 182 may be combined to provide a combined feed stream which is passed to the first methanol converter. The combined feed stream may be passed to a syngas pressure booster compressor to compress the syngas to a particular pressure to provide a compressed syngas stream before passing to the first methanol converter. In an exemplary embodiment, the syngas may be compressed to a pressure from about 6890 kPa (1000 psia) to about 8970 kPa (1300 psia) in the syngas pressure booster compressor. The syngas stream may be heated before passing to the first methanol converter. The compressed syngas stream may be heat exchanged in a heat exchanger to provide a heated syngas stream. The compressed and heated syngas stream may be passed to the first methanol converter.

In the first methanol converter of the methanol synthesis section, the syngas is converted to a methanol composition. The methanol synthesis process is accomplished in the presence of a methanol synthesis catalyst. A suitable methanol synthesis catalyst may be a copper on a zinc oxide and alumina support. Synthesis conditions of the first methanol converter of the methanol synthesis section may include a temperature of about 200 to about 300° C. and a pressure of about 3.5 to about 10 MPa. Reaction equilibrium typically requires methanol separation and recycle of unreacted reagents to the synthesis reaction.

In accordance with an exemplary embodiment, the first methanol converter may be operated at a temperature of about 204° C. (400° F.) to about 290° C. (550° F.). In accordance with another exemplary embodiment, the first methanol converter may be operated at a pressure from about 6890 kPa (1000 psia) to about 8970 kPa (1300 psia).

The methanol synthesis reaction is highly exothermic. Heat may be recovered from the methanol synthesis reaction, for example, by passing a boiler feed water (BFW) to the first methanol converter to generate a steam stream. The generation of steam absorbs the exotherm in the methanol synthesis reaction.

In the first methanol converter, the syngas is converted to a methanol composition in a first reactor effluent comprising methanol. The methanol stream in the first reactor effluent may include methanol, dimethyl ether, ethanol or combinations thereof. The first reactor effluent may be heated and thereafter separated in a first gas-liquid separator to provide a first vapor stream and a first liquid stream. The first vapor stream and the first liquid stream may be further processed to recover methanol.

The first vapor stream comprises carbon dioxide that has not yet converted to methanol. The first vapor stream may be compressed in a first compressor. The first vapor stream may be combined with a make-up hydrogen stream to provide a combined first vapor stream which may be compressed in the first compressor to provide a compressed first vapor stream at a pressure from about 6890 kPa (1000 psia) to about 8970 kPa (1300 psia). The make-up hydrogen stream may be taken from any suitable sources.

The compressed first vapor stream may be passed to the second methanol converter. In the second methanol converter of the methanol synthesis section, the unconverted carbon dioxide in the syngas is converted to a methanol composition. The methanol synthesis process is accomplished in the presence of a methanol synthesis catalyst. A suitable methanol synthesis catalyst may be a copper on a zinc oxide and alumina support. Synthesis conditions of the second methanol converter may include a temperature of about 200 to about 300° C. and a pressure of about 3.5 to about 10 MPa. Reaction equilibrium typically requires methanol separation and recycle of unreacted reagents to the synthesis reaction. A boiler feed water may be passed to the second methanol converter to recover heat and generate a steam stream.

In the second methanol converter, the first reactor effluent is converted to a methanol composition to provide a second reactor effluent comprising methanol. The methanol stream in the second reactor effluent may include methanol, dimethyl ether, ethanol or combinations thereof. The second reactor effluent may be heated and thereafter separated to provide a second vapor stream and a second liquid stream. The second vapor stream and the second liquid stream may be further processed to recover methanol.

In accordance an exemplary embodiment, the second methanol converter may be operated at a temperature of about 204° C. (400° F.) to about 290° C. (550° F.). In accordance with another exemplary embodiment, the second methanol converter may be operated at a pressure from about 6890 kPa (1000 psia) to about 8970 kPa (1300 psia).

The first liquid stream and the second liquid stream are separated in a third gas-liquid separator into a third vapor stream and a third liquid stream. The third liquid stream comprises crude methanol. Alternately, the third liquid stream may be a crude methanol stream. The crude methanol stream may comprise at least 100 ppmw of carbon oxide and/or at least 100 ppmw C2+ oxygenates.

Methanol is converted into light olefin products by a methanol to olefin (MTO) process in an MTO reactor of the fuel production unit 150. Molecular sieves such as microporous crystalline zeolite and non-zeolitic catalysts, particularly silicoaluminophosphates (SAPO), are known to promote the conversion of oxygenates such as methanol to hydrocarbon mixtures, particularly hydrocarbon mixtures composed largely of light olefins. SAPO catalysts and their formulation are generally taught in U.S. Pat. Nos. 4,499, 327A, 10,358,394 and 10,384,986. Light olefins produced from the MTO process are concentrated in ethylene and propylene but include C4 to C6 olefins.

The methanol stream is charged to a MTO reactor and contacted with an MTO catalyst at MTO reaction conditions to convert methanol to olefins and water. The methanol stream may include methanol, dimethyl ether, ethanol or combinations thereof. The MTO reaction conditions include contact with a SAPO catalyst at a pressure between about 2 MPa and about 3.8 MPa. The MTO reaction temperature should be between about 325 to about 450° C. A weight hourly space velocity ("WHSV") in the MTO reactor is in the range of about 2 to about 15 hr-1. The MTO catalyst is separated from the product olefin stream after the MTO reaction.

In accordance with the present disclosure, the crude methanol stream may be passed to an oxygenate conversion unit comprising the MTO reactor. In accordance with an embodiment, the crude methanol stream may be first passed to a methanol purification section to separate by-products and/or impurities and provide a methanol product stream for the MTO reactor. The methanol purification section may comprise one or more distillation columns to separate the methanol product stream.

The methanol product stream is passed to the MTO reactor that reacts the methanol with fluidized catalyst. The reactor effluent stream from the MTO reactor may be quenched and fed to a product separator column. The product separator column may comprise one or more stripper columns. An overhead product stream comprising olefins is taken from the product separator column.

The olefin product stream may be compressed and fed to an absorber separator to separate a light olefinic vapor stream comprising C3-olefins from a heavy olefinic liquid stream comprising C4+ olefins. The light olefinic vapor stream may be further cooled to provide a vaporous light olefin stream comprising C2-hydrocarbons and gases and a liquid light olefin stream comprising C3+ hydrocarbons. The vaporous light olefin stream and the liquid light olefin stream may be oligomerized to produce a sustainable fuel.

Olefin oligomerization is a process that can oligomerize smaller olefins into larger olefins. More specifically, it can convert olefins including oligomerized olefins into distillates including jet fuel and diesel range products. The oligomerized distillate can be saturated for use as transportation fuels.

A charge olefin stream comprising the vaporous light olefin stream and the liquid light olefin stream may be oligomerized with an oligomerization catalyst in a oligomerization section to produce an oligomerized olefin stream. The oligomerization of the charge olefin stream may be a multistage process. A dealkanizer column can be used to remove light alkanes that would be inert and accumulate in a recycle loop.

The oligomerization catalyst may include a zeolitic catalyst. The oligomerization catalyst may be considered a solid acid catalyst. The zeolite may comprise between about 5 and about 95 wt % of the catalyst, for example between about 5 and about 85 wt %. Suitable zeolites include zeolites having a structure from one of the following classes: MFI, MEL, ITH, IMF, TUN, FER, BEA, FAU, BPH, MEI, MSE, MWW, UZM-8, MOR, OFF, MTW, TON, MTT, AFO, ATO, and AEL. Three-letter codes indicating a zeotype are as defined by the Structure Commission of the International Zeolite Association and are maintained at http://www.iza-structure.org/databases. UZM-8 is as described in U.S. Pat. No. 6,756,030. In a preferred aspect, the first-stage oligomerization catalyst may comprise a zeolite with a framework having a ten-ring pore structure. Examples of suitable zeolites having a ten-ring pore structure include TON, MTT, MFI, MEL, AFO, AEL, EUO and FER. In a further preferred aspect, the first-stage oligomerization catalyst comprising a zeolite having a ten-ring pore structure may comprise a uni-dimensional pore structure. A uni-dimensional pore structure indicates zeolites containing non-intersecting pores that are substantially parallel to one of the axes of the crystal. The pores preferably extend through the zeolite crystal. Suitable examples of zeolites having a ten-ring uni-dimensional pore structure may include MTT. In a further aspect, the first-stage oligomerization catalyst comprises an MTT zeolite.

The oligomerized stream from the first stage oligomerization may be further oligomerized over a second-stage oligomerization catalyst comprising nickel on alumina to produce an oligomerized olefin stream.

The oligomerized olefin stream comprises jet fuel, diesel fuel, and alkanes. The oligomerized olefin stream is separated into a liquid fuel stream and an alkane stream. In accordance with the present disclosure, the oligomerized olefin stream may be reacted with hydrogen in the presence of a hydrogenation catalyst to saturate the olefins to paraffins to create a crude jet fuel stream. The crude jet fuel stream may be fractionated by means of distillation column to remove excess hydrogen and more alkanes and provide a liquid fuel comprising jet fuel. The jet fuel stream may be taken in line 152 from the fuel production unit 150. A diesel stream may also be taken from the distillation column.

In an aspect, the separated alkane stream may be passed back to the gas processing unit 140 to produce the syngas mixture and processed as previously described.

The current integrated process maximizes the production of liquid fuel from the one or more of the separated carbon oxides streams produced after processing the renewable feed stream.

Figure 2:
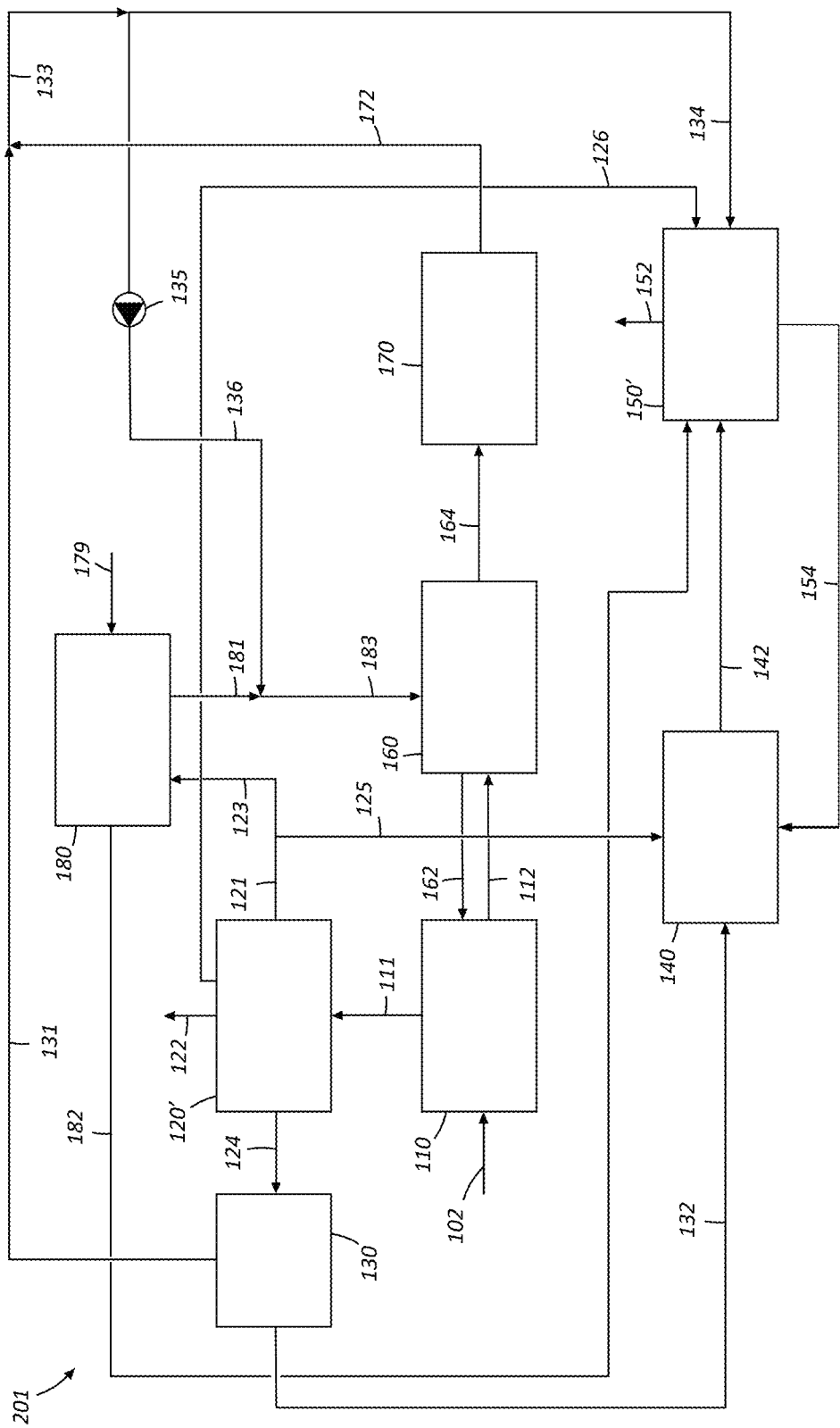
FIG. 2 is a simplified process flow diagram of an alternative embodiment of FIG. 1.

FIG. 2 shows an alternative embodiment to the embodiment of FIG. 1. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the following exceptions.

In the process 201 shown in FIG. 2, an olefin stream comprising C2-C3 olefins is also separated from the cracking effluent stream in line 111 in the separation unit 120'. An olefin stream comprising C2-C3 olefins is separated and taken in line 126 from the separation unit 120'. In accordance with the present disclosure, the olefin stream in line 126 is a bio-olefin stream. In an aspect, the olefin stream in line 126 is passed to fuel production unit 150'. The olefin stream in line 126 is passed to the oligomerization reactor and oligomerized to produce the oligomerized olefin stream comprising jet fuel and diesel fuel. The rest of the process 201 is same as described in FIG. 1 for process 101.

Figure 3:
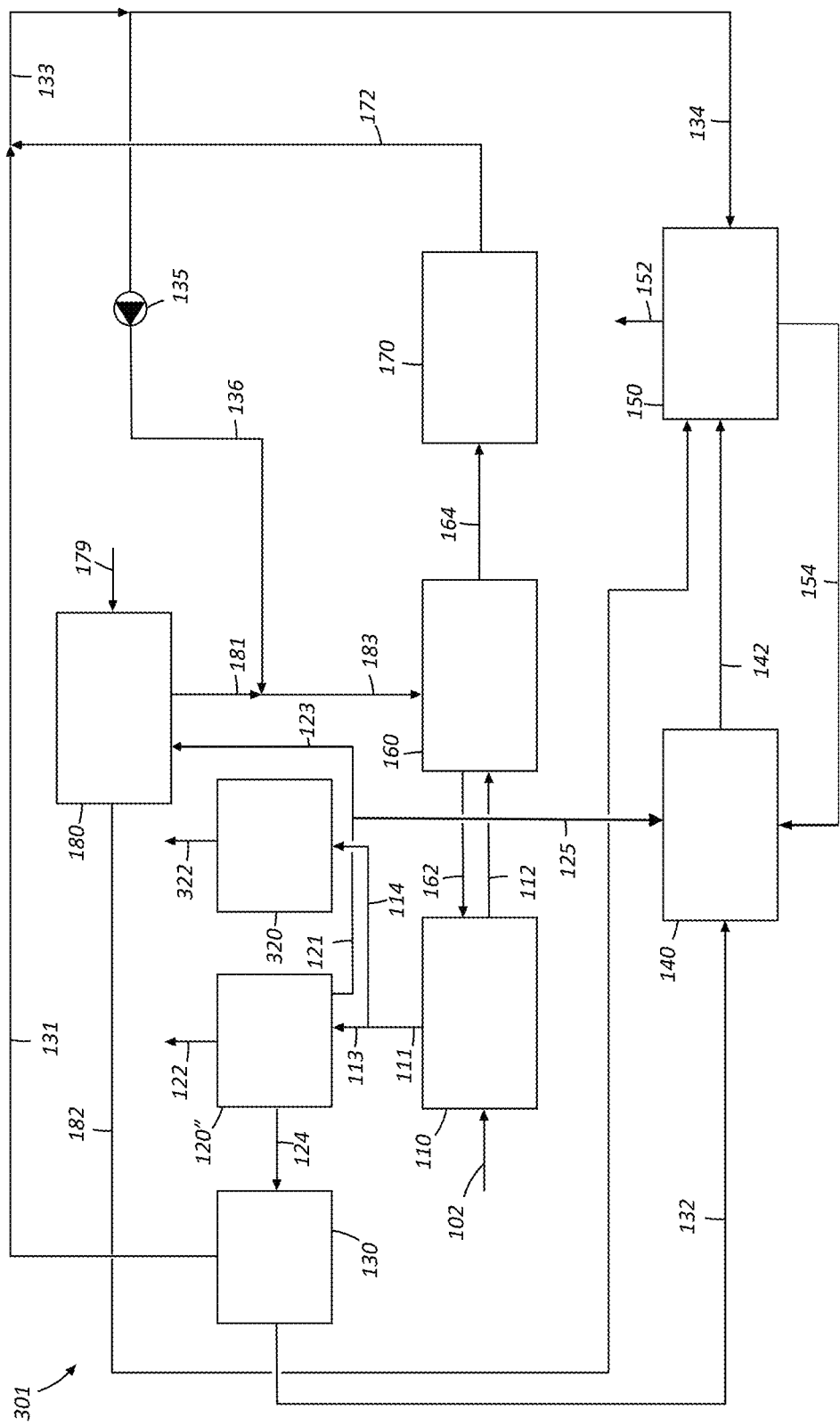
FIG. 3 is a simplified process flow diagram of a further alternative embodiment of FIG. 1.

FIG. 3 shows an alternative embodiment to the embodiment of FIG. 1 with a hydroprocessing unit 320. Elements in FIG. 3 with the same configuration as in FIG. 2 will have the same reference numeral as in FIG. 1. Elements in FIG. 3 which have a different configuration as the corresponding element in FIG. 1 will have the same reference numeral but designated with a double prime symbol ("). The configuration and operation of the embodiment of FIG. 3 is essentially the same as in FIG. 1 with the following exceptions.

In the process 301 shown in FIG. 3, a dedicated hydroprocessing unit 320 is provided to provide a one or more of the SAF, bio-diesel, bio-lubes, and bio-marine fuel in at least one product line 322 of the hydroprocessing unit 320. In accordance with the present disclosure, the cracking effluent stream in line 111 is separated into a first cracking effluent stream in line 113 and a second cracking effluent stream in line 114. The first cracking effluent stream in line 113 is passed to the separation unit 120" and processed as previously described.

The second cracking effluent stream in line 114 is passed to the hydroprocessing unit 320. In an embodiment, the hydroprocessing unit 320 may comprise a hydrotreating section and a hydroprocessing section. The second cracking effluent stream in line 114 may be passed to the hydrotreating section to provide a hydrotreated effluent stream. In the hydrotreating section, the second cracking effluent stream is contacted with a hydrotreating catalyst in the presence of hydrogen at hydrotreating conditions to saturate the olefinic or unsaturated portions of the second cracking effluent stream. The hydrotreating catalyst also catalyzes hydrodesulfurization of organic sulfur and hydrodenitrogenation of organic nitrogen in the second cracking effluent stream. Essentially, the hydrotreating reaction removes heteroatoms from the hydrocarbons and saturates olefins in the second cracking effluent stream.

The hydrotreating catalyst may comprise nickel, nickel and molybdenum, or cobalt and molybdenum dispersed on a high surface area support such as alumina. Other catalysts include one or more noble metals dispersed on a high surface area support. Non-limiting examples of noble metals include platinum and/or palladium dispersed on an alumina support such as gamma-alumina. Suitable hydrotreating catalysts include BDO 200, BDO 300 or BDO 400 available from UOP LLC in Des Plaines, Illinois. The hydrotreating reaction temperature may range from between about 343° C. (650° F.) and about 427° C. (800° F.) and preferably between about 349° C. (690° F.) and about 400° C. (752° F.). Generally, hydrotreating conditions include a pressure of about 700 kPa (100 psig) to about 21 MPa (3000 psig).

A hydrotreated stream is produced from the hydrotreating reactor of the hydrotreating section comprising a hydrocarbon fraction which has a substantial n-paraffin concentration. Oxygenate concentration in the hydrocarbon fraction is essentially nil, whereas the olefin concentration is substantially reduced relative to the second cracking effluent stream in line 114.

The hydrotreated stream may be separated to provide a hydrotreated vapor stream and a hydrotreated liquid stream having a smaller oxygen concentration stream than the second cracking effluent stream in line 114.

The hydrotreated liquid stream may be passed to a hydrocracking reactor to provide greater yield of hydrocarbons in the fuel range. The hydrotreated liquid stream is contacted with a hydrocracking catalyst and hydrogen in the hydrocracking reactor.

The hydrocracking catalyst may utilize amorphous silica-alumina bases or zeolite bases combined with one or more Group VIII or Group VIB metal hydrogenating components to selectively produce a balance of light diesel and jet fuel distillate. In another aspect, a catalyst which comprises, in general, any crystalline zeolite cracking base upon which is deposited a Group VIII metal hydrogenating component may be suitable. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present disclosure as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of noble metals, it is normally preferred to use about 0.05 to about 2 wt % noble metal. Noble metals may be preferred as the hydrogenation metal on the hydrocracking catalyst to provide selectivity to jet fuel due to the absence of hydrogen sulfide and ammonia which can deactivate noble metal catalysts, but which have been removed upstream in the process.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (1200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such, or they may contain a minor proportion of an added hydrogenating metal such as a Group VIB and/or Group VIII metal. Additional metal promoted hydrocracking catalysts may also be utilized in the process of the present disclosure which comprises, for example, aluminophosphate molecular sieves, crystalline chromosilicates and other crystalline silicates. Crystalline chromosilicates are more fully described in U.S. Pat. No. 4,363,178.

The hydrocracking conditions may include a temperature from about 290° C. (550° F.) to about 468° C. (875° F.), preferably 300° C. (572° F.) to about 445° C. (833° F.), a pressure from about 2.7 MPa (gauge) (400 psig) to about 20.7 MPa (gauge) (3000 psig), a LHSV from about 0.4 to less than about 20 hr-1 and a hydrogen rate of about 255 $Nm^3/m^3$ (1,500 scf/bbl) to about 2,527 $Nm^3/m^3$ oil (15,000 scf/bbl).

A hydrocracked stream may exit the hydrocracking reactor and be separated into a hydrocracked liquid stream. A desired product, such as a transportation fuel, may be recovered or separated from the hydrocracked liquid stream. However, the hydrocracked liquid stream comprises a high concentration of normal paraffins, and it will possess poor cold flow properties. Accordingly, to improve the cold flow properties, the hydrocracked liquid stream may be passed to a hydroisomerization reactor.

A hydrogen stream is also passed to the hydroisomerization reactor. Hydroisomerization, including hydrodewaxing, of the normal hydrocarbons in the hydroisomerization reactor can be accomplished over one or more beds of hydroisomerization catalyst.

Suitable hydroisomerization catalysts may comprise a metal of Group VIII (IUPAC 8-10) of the Periodic Table and a support material. Suitable Group VIII metals include platinum and palladium, each of which may be used alone or in combination. The hydroisomerization catalyst may include non-noble metals which are not as susceptible to sulfur deactivation in a sour environment. Examples of suitable non-noble metals include Ni, Mo, Co, W, Mn, Cu, Zn or Ru. Mixtures of hydrogenation metals may also be used such as Co/Mo, Ni/Mo and Ni/W. The amount of hydrogenation metal or metals may range from 0.1 to 5 wt. %, based on the catalyst weight. Methods of loading metal onto the support material include, for example, impregnation of the support material with a metal salt of the hydrogenation component and heating. The catalyst support material containing the hydrogenation metal may also be sulfided prior to use.

The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal, Me, is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2$: $Al_2O_3$ ratio is higher than 300:1; (b) one or more metal(s) belonging to Group VIIIA, selected from platinum and palladium, in an amount comprised within the range of from 0.05 to 5% by weight. V. Calemma et al., App. Catal. A: Gen., 190 (2000), 207 teaches yet another suitable catalyst. Alumina or silica may be added to the support material.

DI-200 available from UOP LLC in Des Plaines, Illinois may be a suitable hydroisomerization catalyst.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

A hydroisomerized stream from the hydroisomerization reactor is a branched-paraffin-rich stream having a greater concentration of branched paraffins than the feed stream entering the hydroisomerization reactor. A hydroisomerized liquid stream is taken and passed to a product distillation column. In the product distillation column, the hydroisomerized liquid stream is fractionated to provide a bio-naphtha stream, a bio-jet fuel stream, a bio-diesel stream, and a bio-marine fuel stream. The bio-jet fuel stream may have a T5 of about 115° C. (239° F.) to about 130° C. (266° F.) and a T90 of about 240° C. (464° F.) to about 270° C. (518° F.). The jet fuel stream will meet the ASTM D7566 jet fuel specification. One or more of the product streams form the product distillation column may be taken in the product line 322 of the hydroprocessing unit 320. The rest of the process is the same as described in FIG. 1.

EXAMPLE

A yield estimate data was generated for a 100% renewable feed of 100 KMTA. Results of the estimate are provided in table below:

TABLE

| S. No. | Stream Name | Yield |
|---|---|---|
| 1. | Renewable feed stream 102 | 100 KMTA |
| 2. | Product stream 122 (bio-propylene, bio-butylene, bio-gasoline, and bio-marine fuel) | 40 KMTA |
| 3. | Dry gas stream 124 | 25 KMTA |
| 4. | Water stream 121 | 20 KMTA |
| 5. | Water stream 179 | 30 KMTA |
| 6. | Water stream 123 | 10 KMTA |
| 7. | Green hydrogen stream 182 | 5 KMTA |
| 8. | Oxygen stream 181 | 30 KMTA |
| 9. | CO2 rich stream 131 | 10 KMTA |
| 10. | CO2 lean stream 132 | 15 KMTA |
| 11. | regenerator CO2 stream 172 | 52 KMTA |
| 12. | CO2 recycle stream 136 | 54 KMTA |
| 13. | CO2 feed stream 134 | 8 KMTA |
| 14. | Water stream 125 | 10 KMTA |
| 15. | Syngas stream 142 | 30 KMTA |
| 16. | Jet fuel stream 152 | 35 KMTA |

The current process produced a total product stream of 40 KMTA including bio-propylene, bio-butylene, bio-gasoline, and bio-marine fuel. Also, the process produced jet fuel from the CO2 streams. As evident form the table, the process produces jet fuel from various CO2 stream including the CO2 rich stream 131 and the CO2 lean stream 132.

SPECIFIC EMBODIMENTS

While the following is described in conjunction with specific embodiments, it will be understood that this description is intended to illustrate and not limit the scope of the preceding description and the appended claims.

A first embodiment of the present disclosure is a process for production of a liquid fuel from carbon oxides, comprising contacting a hydrocarbon feed stream with a catalyst in a reactor to produce a reactor effluent stream; separating a dry gas stream from the reactor effluent stream and further separating the dry gas stream into a CO2 rich stream and a CO2 lean stream; producing methanol from the CO2 lean stream or the CO2 rich stream; contacting the methanol with an MTO catalyst to produce an olefin stream; and oligomerizing the olefin stream with an oligomerization catalyst in an oligomerization reactor to produce an oligomerized olefin stream. An embodiment of the present disclosure is one, any or all of prior embodiments in this paragraph up through the first embodiment in this paragraph further comprising hydrogenating the oligomerized olefin stream to produce sustainable aviation fuel. An embodiment of the present disclosure is one, any or all of prior embodiments in this paragraph up through the first embodiment in this paragraph further comprising generating a syngas stream comprising one or more of carbon dioxide, hydrogen, carbon monoxide, and water vapor, from the CO2 lean stream; and producing methanol from the syngas stream. An embodiment of the present disclosure is one, any or all of prior embodiments in this paragraph up through the first embodiment in this paragraph, wherein the step of generating the syngas stream is a step of catalytic or noncatalytic partial oxidation or a steam reforming step or autothermal reforming step. An embodiment of the present disclosure is one, any or all of prior embodiments in this paragraph up through the first embodiment in this paragraph further comprising producing methanol from the CO2 rich stream. An embodiment of the present disclosure is one, any or all of prior embodiments in this paragraph up through the first embodiment in this paragraph further comprising separating one or more of propylene, butylene, gasoline, heavy oils and marine fuel from the reactor effluent stream. An embodiment of the present disclosure is one, any or all of prior embodiments in this paragraph up through the first embodiment in this paragraph further comprising separating olefinic streams from the reactor effluent stream; and passing the olefinic streams to the oligomerization reactor. An embodiment of the present disclosure is one, any or all of prior embodiments in this paragraph up through the first embodiment in this paragraph further comprising passing a spent catalyst stream to a regenerator to regenerate the spent catalyst and produce a regenerator flue gas stream; passing the regenerated catalyst stream to the reactor; separating one or more of particulate matter, water, NOx, and SOX from the regenerator flue gas stream to provide a regenerator CO2 stream; and producing methanol from the regenerator CO2 stream. An embodiment of the present disclosure is one, any or all of prior embodiments in this paragraph up through the first embodiment in this paragraph further comprising separating the reactor effluent stream into a vaporous stream and a liquid effluent stream; hydroprocessing the liquid effluent stream to produce a hydroprocessed effluent stream; and separating the hydroprocessed effluent stream to provide one or more of a jet fuel stream, a diesel stream, and a marine fuel stream. An embodiment of the present disclosure is one, any or all of prior embodiments in this paragraph up through the first embodiment in this paragraph further comprising converting water to hydrogen and oxygen in an electrolyzer, wherein the electrolyzer is powered by green energy; and passing a hydrogen stream from the electrolyzer to the steps of producing methanol. An embodiment of the present disclosure is one, any or all of prior embodiments in this paragraph up through the first embodiment in this paragraph further comprising combining the regenerator CO2 stream with the CO2 rich stream to provide a combined CO2 stream; and producing methanol from the combined CO2 stream. An embodiment of the present disclosure is one, any or all of prior embodiments in this paragraph up through the first embodiment in this paragraph further comprising taking the dry gas stream from a gas concentration unit; and separating the dry gas stream into the CO2 rich stream and the CO2 lean stream in an absorption unit. An embodiment of the present disclosure is one, any or all of prior embodiments in this paragraph up through the first embodiment in this paragraph, wherein the step of producing methanol comprises reacting a mixture of carbon dioxide, carbon monoxide and hydrogen to produce a crude methanol stream, containing methanol, water, and other contaminants comprising one or more of hydrogen, CO, CO2, methane, ethanol, and other oxygenated hydrocarbons; and purifying the crude methanol stream by means of distillation to remove light contaminants, heavy contaminants, and water to produce a refined methanol stream. An embodiment of the present disclosure is one, any or all of prior embodiments in this paragraph up through the first embodiment in this paragraph further comprising contacting the refined methanol stream with the MTO catalyst to produce a crude olefin stream containing ethylene, propylene, butylenes, and other contaminants comprising one or more of hydrogen, CO, CO2, methane, dimethyl ether, ethanol, and other oxygenated hydrocarbons; purifying the crude olefin stream by means of distillation followed by water absorption to produce one or more refined olefin streams; reacting the one or more of the refined olefin streams with one or more oligomerization catalysts using one or more reaction vessels to produce a crude oligomerized olefin stream comprising oligomerized olefins; fractionating the crude oligomerized olefin stream by means of distillation to produce a refined oligomerized olefin stream comprising olefins having carbon lengths between 12 and 24 carbons; reacting the refined oligomerized olefin stream with hydrogen with a hydrogenation catalyst to saturate the olefins to paraffins to create a crude jet fuel stream; and fractionating the crude jet fuel stream to produce naphtha, diesel, and a liquid fuel comprising jet fuel.

A second embodiment of the present disclosure is a process for production of a liquid fuel from carbon dioxide, comprising contacting a hydrocarbon feed stream with a catalyst in a reactor to produce a reactor effluent stream; separating a dry gas stream from the reactor effluent stream and further separating the dry gas stream into a CO2 rich stream and a CO2 lean stream; generating a syngas stream comprising one or more of carbon dioxide, hydrogen, carbon monoxide, and water vapor, from the a CO2 lean stream; producing methanol from the syngas stream and the CO2 rich stream; contacting the methanol with an MTO catalyst to produce an olefin stream; and oligomerizing the olefin stream with an oligomerization catalyst in an oligomerization reactor to produce an oligomerized olefin stream; and separating the oligomerized olefin stream to provide a sustainable aviation fuel stream. An embodiment of the present disclosure is one, any or all of prior embodiments in this paragraph up through the second embodiment in this paragraph, wherein the step of generating the syngas stream is a step of catalytic or noncatalytic partial oxidation or a steam reforming or autothermal reforming step. An embodiment of the present disclosure is one, any or all of prior embodiments in this paragraph up through the second embodiment in this paragraph further comprising separating one or more of propylene, butylene, gasoline, heavy oils and marine fuel from the reactor effluent stream. An embodiment of the present disclosure is one, any or all of prior embodiments in this paragraph up through the second embodiment in this paragraph further comprising separating olefinic streams from the reactor effluent stream; and passing the olefinic streams to the oligomerization reactor.

A third embodiment of the present disclosure is a process for production of a liquid fuel from carbon dioxide, comprising contacting a renewable feed stream with a catalyst in a reactor to produce a reactor effluent stream; separating a dry gas stream and one or more of propylene, butylene, gasoline, heavy oils and marine fuel from the reactor effluent stream; separating the dry gas stream into a CO2 rich stream and a CO2 lean stream; producing methanol from the CO2 rich stream and CO2 lean stream; contacting the methanol with an MTO catalyst to produce an olefin stream; oligomerizing the olefin stream with an oligomerization catalyst in an oligomerization reactor to produce an oligomerized olefin stream; and hydrogenating the oligomerized olefin stream to produce a sustainable aviation fuel stream. An embodiment of the present disclosure is one, any or all of prior embodiments in this paragraph up through the third embodiment in this paragraph further comprising generating a syngas stream comprising one or more of carbon dioxide, hydrogen, carbon monoxide, and water vapor, from the CO2 lean stream; and producing methanol from the syngas stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for production of a liquid fuel from carbon oxides, comprising:
   contacting a hydrocarbon feed stream with a catalyst in a reactor to produce a reactor effluent stream;
   passing said reactor effluent stream to a separation unit to recover a dry gas stream, wherein said dry gas stream is taken from a gas concentration unit of said separation unit;
   separating the dry gas stream into a CO2 rich stream and a CO2 lean stream, wherein;
   producing methanol from said CO2 lean stream or said CO2 rich stream;
   contacting said methanol with an MTO catalyst to produce an olefin stream; and
   oligomerizing said olefin stream with an oligomerization catalyst in an oligomerization reactor to produce an oligomerized olefin stream.

2. The process of claim 1 further comprising:
   hydrogenating said oligomerized olefin stream to produce sustainable aviation fuel.

3. The process of claim 1 further comprising:
   generating a syngas stream comprising one or more of carbon dioxide, hydrogen, carbon monoxide, and water vapor, from said CO2 lean stream; and
   producing methanol from said syngas stream.

4. The process of claim 3, wherein the step of generating the syngas stream is a step of catalytic or noncatalytic partial oxidation or a steam reforming step or autothermal reforming step.

5. The process of claim 3 further comprising producing methanol from said CO2 rich stream.

6. The process of claim 3, wherein the step of producing methanol comprises:

reacting a mixture of carbon dioxide, carbon monoxide and hydrogen to produce a crude methanol stream, containing methanol, water, and other contaminants comprising one or more of hydrogen, CO, CO2, methane, ethanol, and other oxygenated hydrocarbons; and purifying said crude methanol stream by means of distillation to remove light contaminants, heavy contaminants, and water to produce a refined methanol stream.

7. The process of claim 6 further comprising:

contacting said refined methanol stream with the MTO catalyst to produce a crude olefin stream containing ethylene, propylene, butylenes, and other contaminants comprising one or more of hydrogen, CO, CO2, methane, dimethyl ether, ethanol, and other oxygenated hydrocarbons;

purifying said crude olefin stream by means of distillation followed by water absorption to produce one or more refined olefin streams;

reacting said one or more of said refined olefin streams with one or more oligomerization catalysts using one or more reaction vessels to produce a crude oligomerized olefin stream comprising oligomerized olefins;

fractionating said crude oligomerized olefin stream by means of distillation to produce a refined oligomerized olefin stream comprising olefins having carbon lengths between 12 and 24 carbons;

reacting said refined oligomerized olefin stream with hydrogen with a hydrogenation catalyst to saturate the olefins to paraffins to create a crude jet fuel stream; and fractionating said crude jet fuel stream to produce naphtha, diesel, and a liquid fuel comprising jet fuel.

8. The process of claim 1 further comprising separating one or more of propylene, butylene, gasoline, heavy oils and marine fuel from said reactor effluent stream.

9. The process of claim 1 further comprising:

separating olefinic streams from said reactor effluent stream; and passing said olefinic streams to the oligomerization reactor.

10. The process of claim 1 further comprising:

passing a spent catalyst stream to a regenerator to regenerate the spent catalyst and produce a regenerator flue gas stream;

passing the regenerated catalyst stream to said reactor;

separating one or more of particulate matter, water, NOx, and SOX from said regenerator flue gas stream to provide a regenerator CO2 stream; and producing methanol from said regenerator CO2 stream.

11. The process of claim 10 further comprising:

combining said regenerator CO2 stream with said CO2 rich stream to provide a combined CO2 stream; and producing methanol from said combined CO2 stream.

12. The process of claim 1 further comprising:

separating said reactor effluent stream into a vaporous stream and a liquid effluent stream;

hydroprocessing said liquid effluent stream to produce a hydroprocessed effluent stream; and separating said hydroprocessed effluent stream to provide one or more of a jet fuel stream, a diesel stream, and a marine fuel stream.

13. The process of claim 1 further comprising:

converting water to hydrogen and oxygen in an electrolyzer, wherein the electrolyzer is powered by green energy; and passing a hydrogen stream from the electrolyzer to the steps of producing methanol.

14. The process of claim 1 further comprising:

separating said dry gas stream into said CO2 rich stream and said CO2 lean stream in an absorption unit.

15. A process for production of a liquid fuel from carbon oxides, comprising:

contacting a hydrocarbon feed stream with a catalyst in a reactor to produce a reactor effluent stream;

separating a dry gas stream taken from said reactor effluent stream into a CO2 rich stream and a CO2 lean stream;

generating a syngas stream comprising one or more of carbon dioxide, hydrogen, carbon monoxide, and water vapor, from said CO2 lean stream;

producing methanol from said syngas stream and said CO2 rich stream;

contacting said methanol with an MTO catalyst to produce an olefin stream; and oligomerizing said olefin stream with an oligomerization catalyst in an oligomerization reactor to produce an oligomerized olefin stream; and hydrogenating said oligomerized olefin stream to provide a sustainable aviation fuel stream.

16. The process of claim 15, wherein the step of generating the syngas stream is a step of catalytic or noncatalytic partial oxidation or a steam reforming or autothermal reforming step.

17. The process of claim 15 further comprising separating one or more of propylene, butylene, gasoline, heavy oils and marine fuel from said reactor effluent stream.

18. The process of claim 15 further comprising:

separating olefinic streams from said reactor effluent stream; and passing said olefinic streams to the oligomerization reactor.

19. A process for production of a liquid fuel from carbon oxides, comprising:

contacting a renewable feed stream with a catalyst in a reactor to produce a reactor effluent stream;

separating a dry gas stream and one or more of propylene, butylene, gasoline, heavy oils and marine fuel from said reactor effluent stream;

separating said dry gas stream into a CO2 rich stream and a CO2 lean stream;

producing methanol from said CO2 rich stream and CO2 lean stream;

contacting said methanol with an MTO catalyst to produce an olefin stream;

oligomerizing said olefin stream with an oligomerization catalyst in an oligomerization reactor to produce an oligomerized olefin stream; and hydrogenating said oligomerized olefin stream to produce a sustainable aviation fuel stream.

20. The process of claim 19 further comprising:

generating a syngas stream comprising one or more of carbon dioxide, hydrogen, carbon monoxide, and water vapor, from said CO2 lean stream; and producing methanol from said syngas stream.

* * * * *